US012584814B2

(12) United States Patent
Salmatanis et al.

(10) Patent No.: US 12,584,814 B2
(45) Date of Patent: Mar. 24, 2026

(54) FLUID LEAK DETECTION, LOCALIZATION, AND QUANTIFICATION WITH CONFIDENCE

(71) Applicant: Chevron U.S.A. Inc., San Ramon, CA (US)

(72) Inventors: Nikolaos Ioannis Salmatanis, Cypress, TX (US); Tyrone Jenkins, Sugar Land, TX (US); Larry A. Bowden, Jr., Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 251 days.

(21) Appl. No.: 18/479,492

(22) Filed: Oct. 2, 2023

(65) Prior Publication Data

US 2024/0110840 A1 Apr. 4, 2024

Related U.S. Application Data

(60) Provisional application No. 63/413,090, filed on Oct. 4, 2022.

(51) Int. Cl.
| | |
|---|---|
| *G01M 3/04* | (2006.01) |
| *G06T 7/00* | (2017.01) |
| *G06T 7/62* | (2017.01) |
| *G06V 10/26* | (2022.01) |

(52) U.S. Cl.
CPC .................. *G01M 3/04* (2013.01); *G06T 7/62* (2017.01); *G06T 7/97* (2017.01); *G06V 10/273* (2022.01); *G06T 2207/10048* (2013.01)

(58) Field of Classification Search
CPC .......... G01M 3/04; G01M 3/002; G01M 3/38; G06T 7/62; G06T 7/97; G06T 2207/10048; G06T 7/0004; G06T 7/11; G06V 10/273; G06V 10/143; G06V 20/52
See application file for complete search history.

(56) References Cited

U.S. PATENT DOCUMENTS

| | | | | |
|---|---|---|---|---|
| 5,136,876 | A | 8/1992 | Taylor | |
| 2015/0371374 | A1* | 12/2015 | Zeng | G01M 3/38 |
| | | | | 382/274 |
| 2018/0259418 | A1* | 9/2018 | Dudek | G01M 3/04 |
| 2018/0284012 | A1 | 10/2018 | Marta | |
| 2019/0169982 | A1 | 6/2019 | Hauge | |
| 2019/0339159 | A1* | 11/2019 | Israelsen | G06T 7/001 |

(Continued)

OTHER PUBLICATIONS

PCT International Search Report and Written Opinion for PCT Application No. PCT/US2024/30745 mailed Aug. 28, 2024 (11 pages).

(Continued)

*Primary Examiner* — David Z Huang
(74) *Attorney, Agent, or Firm* — Sheppard, Mullin, Richter & Hampton LLP

(57) ABSTRACT

Infrared images of a fluid facility are captured to detect, localize, and quantify fluid leaks with confidence at the fluid facility. Changes in pixel values for a fluid leak, which reflect changes in temperature due to the fluid leak, are used to quantify the fluid leak. The location of the fluid leak is identified using the setup of the infrared camera and the fluid leak captured within the infrared images. A dispersion of the fluid leak is calculated and presented to show the path of the fluid leak.

18 Claims, 8 Drawing Sheets

(56)     References Cited

U.S. PATENT DOCUMENTS

| | | | |
|---|---|---|---|
| 2021/0123870 A1* | 4/2021 | Mahajan | ............ H01M 10/488 |
| 2021/0216852 A1 | 7/2021 | Reece | |
| 2021/0325005 A1 | 10/2021 | Inoue | |
| 2022/0082409 A1 | 3/2022 | Ukil | |
| 2023/0063604 A1 | 3/2023 | Al Daif | |
| 2024/0110878 A1 | 4/2024 | Salmatanis | |

OTHER PUBLICATIONS

PCT International Search Report and Written Opinion for PCT Application No. PCT/US2023/075777 mailed Feb. 7, 2024 (14 pages).

PCT International Search Report and Written Opinion of PCT Applicatioin No. PCT/US2023/075780, mailed Jan. 12, 2024 (8 pages).

* cited by examiner

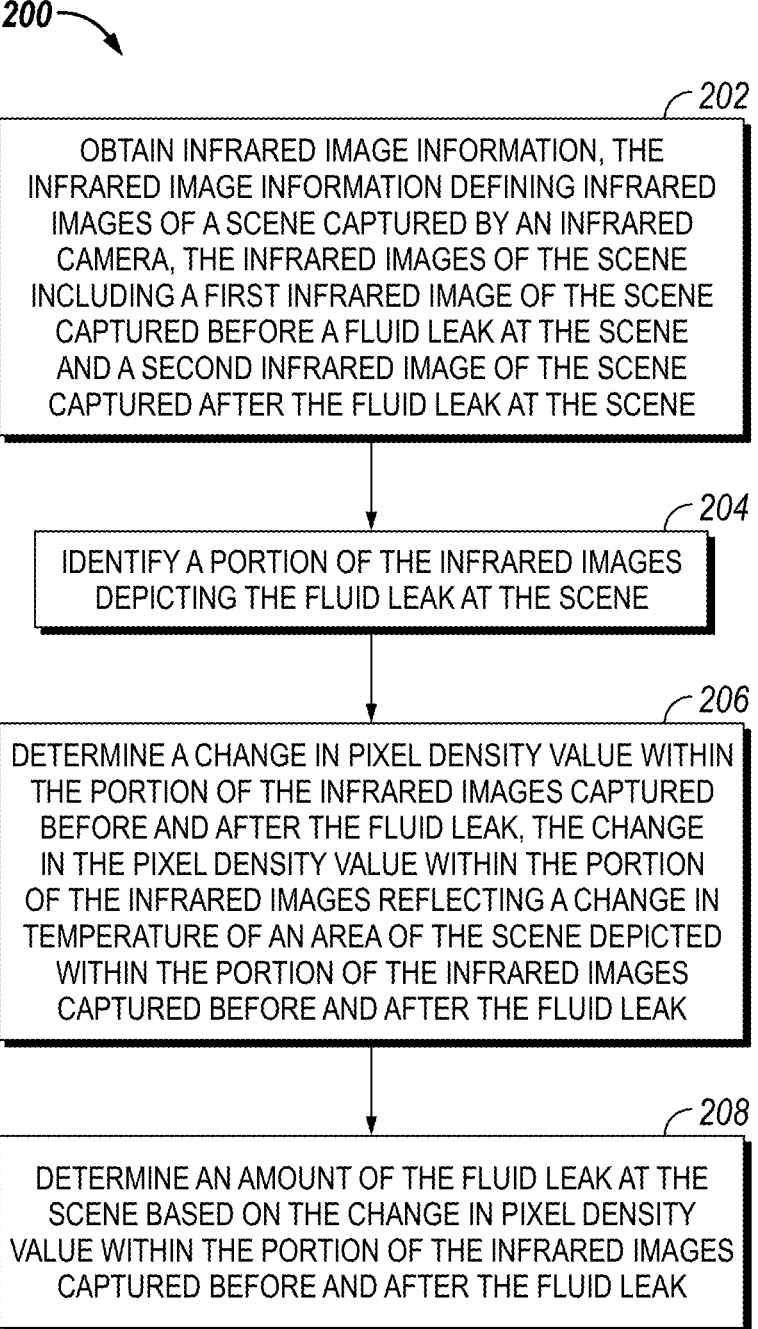

*200*

*202*

OBTAIN INFRARED IMAGE INFORMATION, THE INFRARED IMAGE INFORMATION DEFINING INFRARED IMAGES OF A SCENE CAPTURED BY AN INFRARED CAMERA, THE INFRARED IMAGES OF THE SCENE INCLUDING A FIRST INFRARED IMAGE OF THE SCENE CAPTURED BEFORE A FLUID LEAK AT THE SCENE AND A SECOND INFRARED IMAGE OF THE SCENE CAPTURED AFTER THE FLUID LEAK AT THE SCENE

*204*

IDENTIFY A PORTION OF THE INFRARED IMAGES DEPICTING THE FLUID LEAK AT THE SCENE

*206*

DETERMINE A CHANGE IN PIXEL DENSITY VALUE WITHIN THE PORTION OF THE INFRARED IMAGES CAPTURED BEFORE AND AFTER THE FLUID LEAK, THE CHANGE IN THE PIXEL DENSITY VALUE WITHIN THE PORTION OF THE INFRARED IMAGES REFLECTING A CHANGE IN TEMPERATURE OF AN AREA OF THE SCENE DEPICTED WITHIN THE PORTION OF THE INFRARED IMAGES CAPTURED BEFORE AND AFTER THE FLUID LEAK

*208*

DETERMINE AN AMOUNT OF THE FLUID LEAK AT THE SCENE BASED ON THE CHANGE IN PIXEL DENSITY VALUE WITHIN THE PORTION OF THE INFRARED IMAGES CAPTURED BEFORE AND AFTER THE FLUID LEAK

FLUID LEAK DETECTION, LOCALIZATION, AND QUANTIFICATION WITH CONFIDENCE

CROSS-REFERENCE TO RELATED APPLICATION

The present application claims the benefit of U.S. Provisional Application No. 63/413,090, entitled "Fluid Leak Detection, Localization, and Quantification with Confidence," which was filed on Oct. 4, 2022, the entirety of which is hereby incorporated herein by reference.

FIELD

The present disclosure relates generally to the field of detecting fluid leaks using infrared images.

BACKGROUND

Leaks at fluid facilities may cause equipment failure and/or loss of fluid. Detecting whether fluid leaks are occurring, determining where the fluid leaks are occurring, and quantifying the amount of fluid loss from the fluid leaks may enable more efficient operation of the fluid facilities.

SUMMARY

This disclosure relates to detecting fluid leaks. Infrared image information and/or other information may be obtained. The infrared image information may define infrared images of a scene captured by an infrared camera. The infrared images of the scene may include a first infrared image of the scene captured before a fluid leak at the scene, a second infrared image of the scene captured after the fluid leak at the scene, and/or other infrared images of the scene. A portion of the infrared images depicting the fluid leak at the scene may be identified. A change in pixel density value within the portion of the infrared images captured before and after the fluid leak may be determined. The change in the pixel density value within the portion of the infrared images may reflect a change in temperature of an area of the scene depicted within the portion of the infrared images captured before and after the fluid leak. An amount of the fluid leak at the scene may be determined based on the change in pixel density value within the portion of the infrared images captured before and after the fluid leak and/or other information.

A system for detecting fluid leaks may include one or more electronic storage, one or more processors and/or other components. The electronic storage may store infrared image information, information relating to infrared images of a scene, information relating to the scene, information relating to a fluid leak at the scene, and/or other information.

The processor(s) may be configured by machine-readable instructions. Executing the machine-readable instructions may cause the processor(s) to facilitate detecting fluid leaks. The machine-readable instructions may include one or more computer program components. The computer program components may include one or more of an infrared image component, an identification component, a pixel density value component, a fluid leak component, and/or other computer program components.

The infrared image component may be configured to obtain infrared image information and/or other information. The infrared image information may define infrared images of a scene captured by an infrared camera. The infrared images of the scene may include a first infrared image of the scene captured before a fluid leak at the scene, a second infrared image of the scene captured after the fluid leak at the scene and/or other infrared images of the scene.

The identification component may be configured to identify a portion of the infrared images depicting the fluid leak at the scene. In some implementations, non-fluid leak object detection may be performed on the infrared images of the scene to filter out one or more portions of the infrared images not depicting the fluid leak at the scene.

The pixel density value component may be configured to determine one or more changes in pixel density value within the portion of the infrared images captured before and after the fluid leak. The change(s) in the pixel density value within the portion of the infrared images may reflect one or more changes in temperature of an area of the scene depicted within the portion of the infrared images captured before and after the fluid leak.

In some implementations, the change in the pixel density value within the portion of the infrared images captured before and after the fluid leak may be determined as a difference between a post-fluid leak pixel histogram of the portion captured after the fluid leak and a pre-fluid leak pixel histogram of the portion captured before the fluid leak.

The fluid leak component may be configured to determine an amount of the fluid leak at the scene. The amount of fluid leak at the scene may be determined based on the change(s) in pixel density value within the portion of the infrared images captured before and after the fluid leak and/or other information.

In some implementations, the infrared images captured after the fluid leak may depict the fluid leak in two dimensions. A volume of the fluid leak may be estimated using a cone shaped fluid leak, a tank shaped fluid leak, a pool shaped fluid leak, or other shaped fluid leak.

In some implementations, separate amounts of the fluid leak at the scene for different times may be determined from different infrared image of the scene captured after the fluid leak at the scene. A rate of the fluid leak at the scene may be determined based on the separate amounts of the fluid leak at the scene for the different times and/or other information. In some implementations, a total amount of the fluid leak may be determined based on the rate of the fluid leak at the scene, a duration of the fluid leak at the scene, and/or other information.

In some implementations, a release location of the fluid leak may be determined based on a location of the infrared camera, an orientation of the infrared camera, a distance between the infrared camera and the fluid leak, and/or other information. In some implementations, a dispersion of the fluid leak from the release location may be determined based on a rate of the fluid leak, a wind speed at the scene, a wind direction at the scene, and/or other information.

In some implementations, one or more of the infrared images may be presented on one or more displays. The infrared image(s) may be overlaid with visualization of the fluid leak, a rate of the fluid leak, and a total amount of the fluid leak.

In some implementations, a top-down view of the scene may be presented on one or more displays. The top-down view of the scene may include visualization of a dispersion of the fluid leak.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for detecting fluid leaks.

DETAILED DESCRIPTION

The present disclosure relates to detecting fluid leaks. Infrared images of a fluid facility are captured to detect, localize, and quantify fluid leaks with confidence at the fluid facility. Changes in pixel values for a fluid leak, which reflect changes in temperature due to the fluid leak, are used to quantify the fluid leak. The location of the fluid leak is identified using the setup of the infrared camera and the fluid leak captured within the infrared images. A dispersion of the fluid leak is calculated and presented to show the path of the fluid leak.

Figure 1:
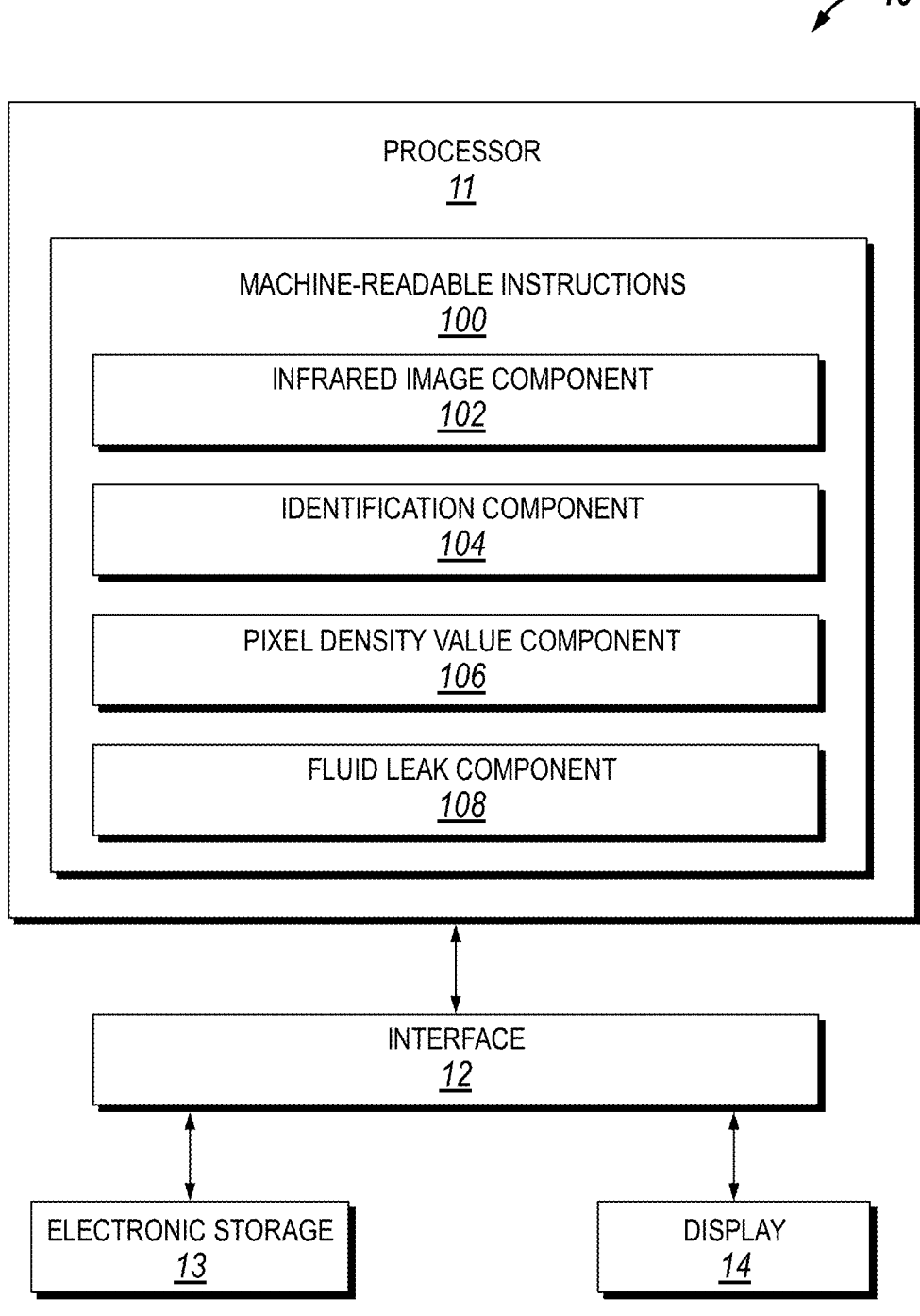
FIG. 1 illustrates an example system for detecting fluid leaks.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Infrared image information and/or other information may be obtained by the processor 11. The infrared image information may define infrared images of a scene captured by an infrared camera. The infrared images of the scene may include a first infrared image of the scene captured before a fluid leak at the scene, a second infrared image of the scene captured after the fluid leak at the scene, and/or other infrared images of the scene. A portion of the infrared images depicting the fluid leak at the scene may be identified by the processor 11. A change in pixel density value within the portion of the infrared images captured before and after the fluid leak may be determined by the processor 11. The change in the pixel density value within the portion of the infrared images may reflect a change in temperature of an area of the scene depicted within the portion of the infrared images captured before and after the fluid leak. An amount of the fluid leak at the scene may be determined by the processor 11 based on the change in pixel density value within the portion of the infrared images captured before and after the fluid leak and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store infrared image information, information relating to infrared images of a scene, information relating to the scene, information relating to a fluid leak at the scene, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present infrared image information, information relating to infrared images of a scene, information relating to the scene, information relating to a fluid leak at the scene, and/or other information.

A fluid facility may refer to a facility (e.g., place, equipment, etc.) that generates, processes, stores, transports, and/or otherwise operates on fluid. Fluid may refer to substance that has no fixed shape. Fluid may refer to substance that yields easily to external pressure. Fluid may be composed of a single type of substance or multiple types of substance. Fluid may exist in one or more forms, such as liquid and/or gas. Examples of fluid include hydrocarbon gas, hydrocarbon liquid, water, wastewater, and chemical. Examples of liquid include crude gasoline, raw pyrolysis gasoline, diesel fuel, jet fuel, produced water, liquid propane, tailings, ethylene, propylene, liquid carbon dioxide, natural gas liquids, and gas condensate. Examples of gas include natural gas, hydrogen, hydrogen sulfide, nitrogen, carbon dioxide, and methane. Other types of fluid are contemplated.

Fluid leaks at fluid facilities may cause damage to the fluid facilities, cause damage to surrounding areas, disrupt fluid facility operations (e.g., cause production disruptions), pose safety hazards, and/or cause other problems. It is critical to detect fluid leaks at fluid facilities. Detection of fluid leaks enable the fluid leaks to be stopped or fixed.

Present disclosure provides a tool to detect, locate, and quantify fluid leaks at fluid facilities using infrared images of the fluid facilities. Fluid leaks at fluid facilities may be detected, located, and/or quantified with confidence. In addition to detecting, locating, and quantifying the fluid leaks, the present disclosure provides the confidence level (e.g., provides accuracy of) the fluid leak detection, location, and/or quantification. Fluid leak detection, location, and quantification of the present disclosure reduces false detection of fluid leaks and reduces costs and time spent in performing maintenance and repair tasks at the fluid facilities.

Image analysis (e.g., object detection, machine learning, image analytics) may be used to identify depiction of a fluid leak within infrared images. Image analysis may be used to filter out known objects (e.g., people, birds, foliage) within the infrared images. Differential temperatures in the fluid leak portion of the infrared images taken before and after the fluid leak may be used to determine the amount of fluid leak (e.g., how much fluid has been released at a moment in time, the rate at which the fluid is being released, the total amount of fluid leak over a duration of time). The amount of fluid leak may be determined using a known/assumed shape of fluid leak geometry (e.g., cone shaped fluid leak, a tank shaped fluid leak, a pool shaped fluid leak).

Location of the fluid leak may be calculated using the location of the infrared camera, the orientation of the infrared camera with respect to the fluid leak, the distance between the infrared camera and the fluid leak, the rate of fluid leak, the conditions in the environment (e.g., wind speed, wind direction, gust speed, gust direction), and/or other information.

Fluid leak detection, localization, and/or quantification may be presented to one or more person at the fluid facility to facilitate operations at the fluid facility (e.g., stop/change operations to stop/change generation, processing, storage, and/or transportation of fluid; stop fluid leak; fix fluid leak). One or more operations at the facility may be automated based on fluid leak detection, localization, and/or quantification. One or more alarms may be generated responsive to fluid leak detection, localization, and/or quantification.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate detecting fluid leaks. The machine-readable instructions 100 may include one or more computer program components. The machine-readable instructions 100 may include one or more of an infrared image component 102, an identification component 104, a pixel density value component 106, a fluid leak component 108, and/or other computer program components.

The infrared image component 102 may be configured to obtain infrared image information and/or other information. Obtaining infrared image information may include one or more of accessing, acquiring, analyzing, determining, examining, generating, identifying, loading, locating, measuring, opening, receiving, retrieving, reviewing, selecting, storing, and/or otherwise obtaining the infrared image information. The infrared image component 102 may obtain infrared image information from one or more locations. For example, the infrared image component 102 may obtain infrared image information from a storage location, such as the electronic storage 13, electronic storage of a device accessible via a network, and/or other locations. The infrared image component 102 may obtain current infrared image from one or more hardware components (e.g., a computing device, an infrared camera) and/or one or more software components (e.g., software running on a computing device). In some implementations, the infrared image information may be obtained from one or more users. For example, a user may interact with a computing device to identify or input infrared image information (e.g., upload infrared images).

The infrared image information may define infrared images of a scene captured by an infrared camera. A scene may refer to a place and/or a location in which the infrared device is located while capturing infrared image. A scene may include one or more portions of a place and/or a location at which the infrared camera is directed/pointed during capture of the infrared images. A scene may include one or more portions of a place and/or a location that are within the field of view of infrared camera during capture of the infrared images. A scene may include static things (e.g., environment, non-moving objects) and/or dynamic things (e.g., moving objects).

Figure 3:
FIG. 3 illustrates an example infrared image of a scene.

Infrared images may refer to images that depict amount of infrared energy emitted, transmitted, and/or reflected by a thing. Pixel values of infrared images may correspond to temperature of the thing. An infrared camera may refer to an image capture device that captures infrared images. An infrared camera may capture infrared images using one or more infrared imaging techniques (e.g., thermal imaging, optical gas imaging, short-wave infrared imaging, mid-wave infrared imaging, long-wave infrared imaging, spectral imaging, wavelength-modulation spectroscopy imaging, LiDAR imaging). In some implementations, different types of infrared imaging techniques may be used for target detection, location, and/or quantification of specific types of fluid. Infrared images may be captured by an infrared camera at a particular rate (frame rate, such as frames per second). FIG. 3 illustrates an example infrared image 300 of a scene.

The system 10 may be remote from an infrared camera or local to the infrared camera. One or more portions of the infrared camera may be remote from or a part of the system 10. One or more portions of the system 10 may be remote from or a part of the infrared camera. One or more functions of the system 10 may be remotely from or locally by the infrared camera. For example, some of all of the fluid detection, localization, and quantification may be performed by the infrared camera or a computing device local to (e.g., located within a threshold distance of the infrared camera, physically connected to the infrared camera) the infrared camera. Some of all of the fluid detection, localization, and quantification may be performed by a computing device remote from (e.g., located a threshold distance away from the infrared camera, connected via network to the infrared camera) the infrared camera. Visualization of the fluid leak and/or other information (e.g., fluid leak dispersion, fluid leak rate, total fluid leak, top-down view of the scene) may be generated by the infrared camera, a computing device local to the infrared camera, or a computing device remote from the infrared camera.

The infrared image information may define an infrared image by describing, characterizing, and/or otherwise defining the infrared image. The infrared image information may define an infrared image by including information that defines one or more content, qualities, attributes, features, and/or other aspects of the infrared image. For example, the infrared image information may define an infrared image by including information that makes up the content of the infrared image and/or information that is used to determine the content of the infrared image. For instance, the infrared image information may include information that makes up and/or is used to determine the arrangement of pixels, characteristics of pixels, values of pixels, and/or other aspects of pixels that define infrared image. Other types of infrared image information are contemplated.

A fluid leak may refer to fluid escaping from a fluid facility. A fluid leak may refer to fluid escaping from equipment at a fluid facility. For example, a fluid leak may refer to fluid escaping from pipes, containers, and/or other equipment that generates, processes, stores, transports, and/or otherwise operates on the fluid.

The infrared images of the scene may include one or more infrared images of the scene captured before a fluid leak at the scene, one or more infrared images of the scene captured after the fluid leak at the scene and/or other infrared images of the scene. The fluid leak at the scene may be detected based on analysis of the infrared images and/or observations made by other sensors. For example, the fluid leak at the scene may be detected based on recognition of the fluid leak within the infrared images, based on sound of the fluid leak being detected by one or more acoustic sensors (e.g., microphone), based on positive fluid detection being reported by one or more gas sensors, one or more fluid sensors, one or more point sensors, and/or other sensors, and/or based on observed made by other sensors.

The identification component 104 may be configured to identify one or more portions of the infrared images depicting the fluid leak at the scene. Identifying a portion of an infrared image depicting the fluid leak may include ascertaining, categorizing, classifying, detecting, determining, establishing, estimating, segmenting, and/or otherwise identifying the portion of the infrared image that includes depiction of the fluid leak. For example, fluid leak object detection may be performed on the infrared images of the scene to identify which portion(s) of the infrared images depict the fluid leak. In some implementations, non-fluid leak object detection may be performed on the infrared images of the scene to filter out one or more portions of the infrared images not depicting the fluid leak at the scene. The non-fluid leak object detection may be performed to exclude certain portion(s) of the infrared images from being identified as depicting the fluid leak.

Identifying a portion of an infrared image depicting the fluid leak may include identifying the boundary/area of the infrared image depicting the fluid leak. Rather than finding a box that contains the fluid leak, the outline of the fluid leak may be determined. Pixels that depict the fluid leak and pixels that do not depict the fluid leak may be identified. Pixels that depict the fluid leak may be segmented from pixels that do not depict the fluid leak.

Figure 4:
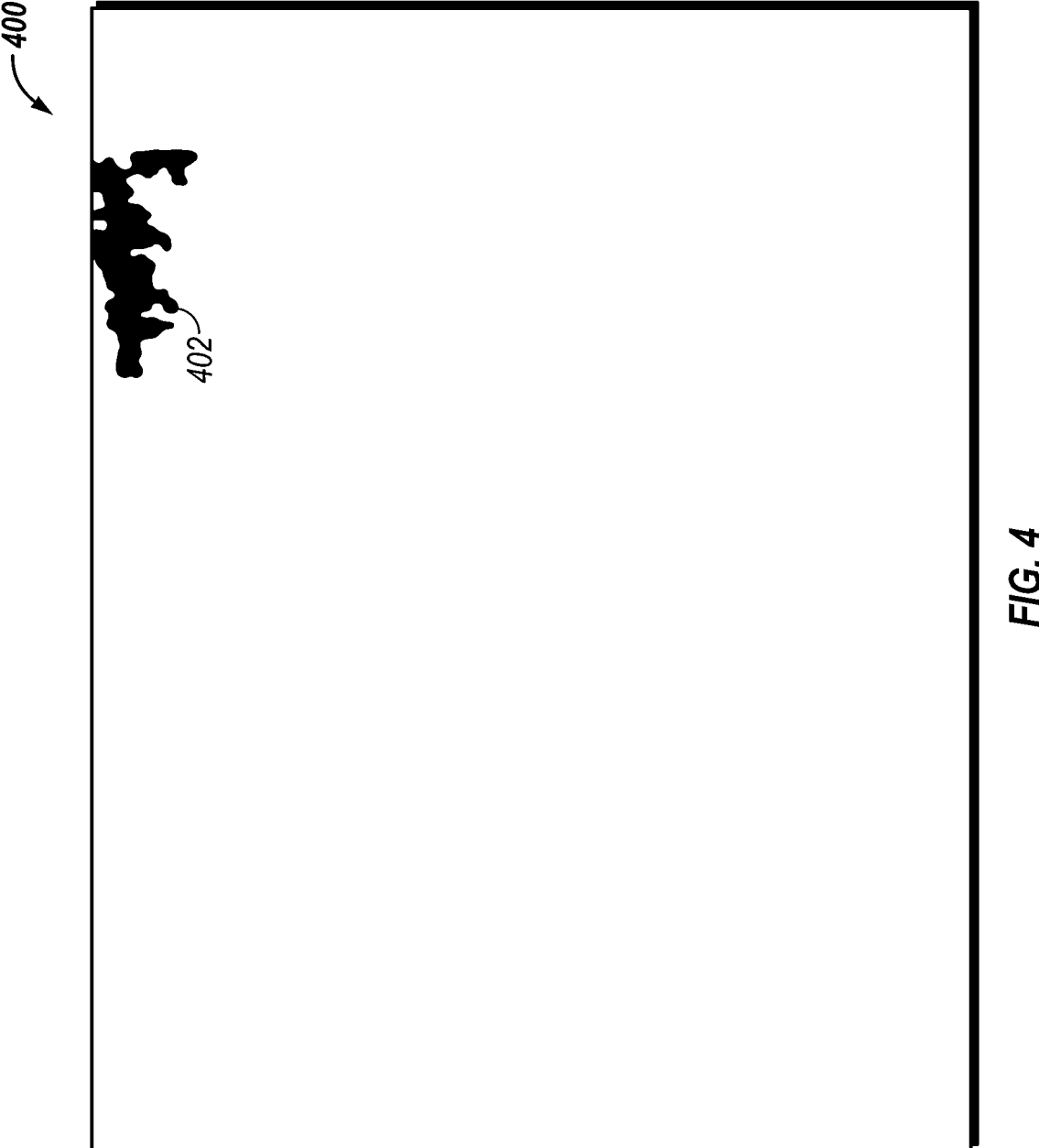
FIG. 4 illustrates an example segmentation of a fluid leak within an infrared image.

FIG. 4 illustrates an example segmentation of a fluid leak within an infrared image 400. A portion 402 of the infrared image 400 may include depiction of the fluid leak. The portion 402 of the infrared image 400 may be segmented from other portions of the infrared image 400 that do not include depiction of the fluid leak.

The pixel density value component 106 may be configured to determine one or more changes in pixel density value within the portion(s) of the infrared images captured before and after the fluid leak. Determining a change in pixel density value may include ascertaining, approximating, calculating, establishing, estimating, finding, identifying, obtaining, quantifying, and/or otherwise determining the change in pixel density value. Pixel density value may refer to value of pixel density within the portion of the infrared images depicting the fluid leak. Pixel density may refer to quantity, distribution, and/or average values of pixel values within the portion(s) of the infrared images depicting the fluid leak. A change in the pixel density value within a portion of different infrared images may reflect a change in temperature of an area of the scene depicted within the portion of the different infrared images.

A change in the pixel density value of infrared images captured before and after the fluid leak may be determined. The pixel density of a portion of an infrared image captured depicting a fluid leak after the fluid leak may be compared with the pixel density of the same portion of the infrared image captured before the fluid leak. The amount of difference between the pixel density values of the same portion may indicate how much the temperature of the corresponding area in the scene have changed between when the two infrared images were captured.

A single or multiple infrared images captured before the fluid leak may be used as a baseline to compare pixel density values of infrared images captured after the leak. For example, a single infrared image captured before the fluid leak may be used to provide comparison with multiple infrared images captured after the fluid leak. The pixel density value of the portion of the post-fluid leak infrared images depicting the fluid leak may be compared with the same portion of the single pre-fluid leak infrared image. The portions that are compared may change as the area of the fluid leak changes over time.

As another example, multiple infrared images captured before the fluid leak may be combined to generate a baseline pre-fluid leak infrared image. For example, multiple pre-fluid leak infrared images may be averaged to produce a baseline pre-fluid leak image with averaged temperatures and less noise. The pixel density value of the portion of the post-fluid leak infrared images depicting the fluid leak may be compared with the same portion of the baseline pre-fluid leak infrared image generated from multiple pre-fluid leak infrared images.

In some implementations, the change in the pixel density value within the portion(s) of the infrared images captured before and after the fluid leak may be determined as a difference between a post-fluid leak pixel histogram of the portion(s) captured after the fluid leak and a pre-fluid leak pixel histogram of the portion(s) captured before the fluid leak. A post-fluid leak pixel histogram may refer to pixel histogram of the portion of the post-fluid leak infrared image depicting the fluid leak. A pre-fluid leak pixel histogram may refer to same portion of the pre-fluid leak infrared image. The difference between a post-fluid leak pixel histogram and a pre-fluid leak pixel histogram may include the difference between the area under the post-fluid leak pixel histogram and the area under the pre-fluid leak pixel histogram. For example, integral of the pre-fluid leak pixel histogram curve and integral of the post-fluid leak pixel histogram curve may be calculated, and the difference of the integrations may be calculated as the change in the pixel density value. The difference between the integral of the pre-fluid leak pixel histogram curve and integral of the post-fluid leak pixel histogram curve may represent the average pixel density change before and after the fluid leak.

Figure 5:
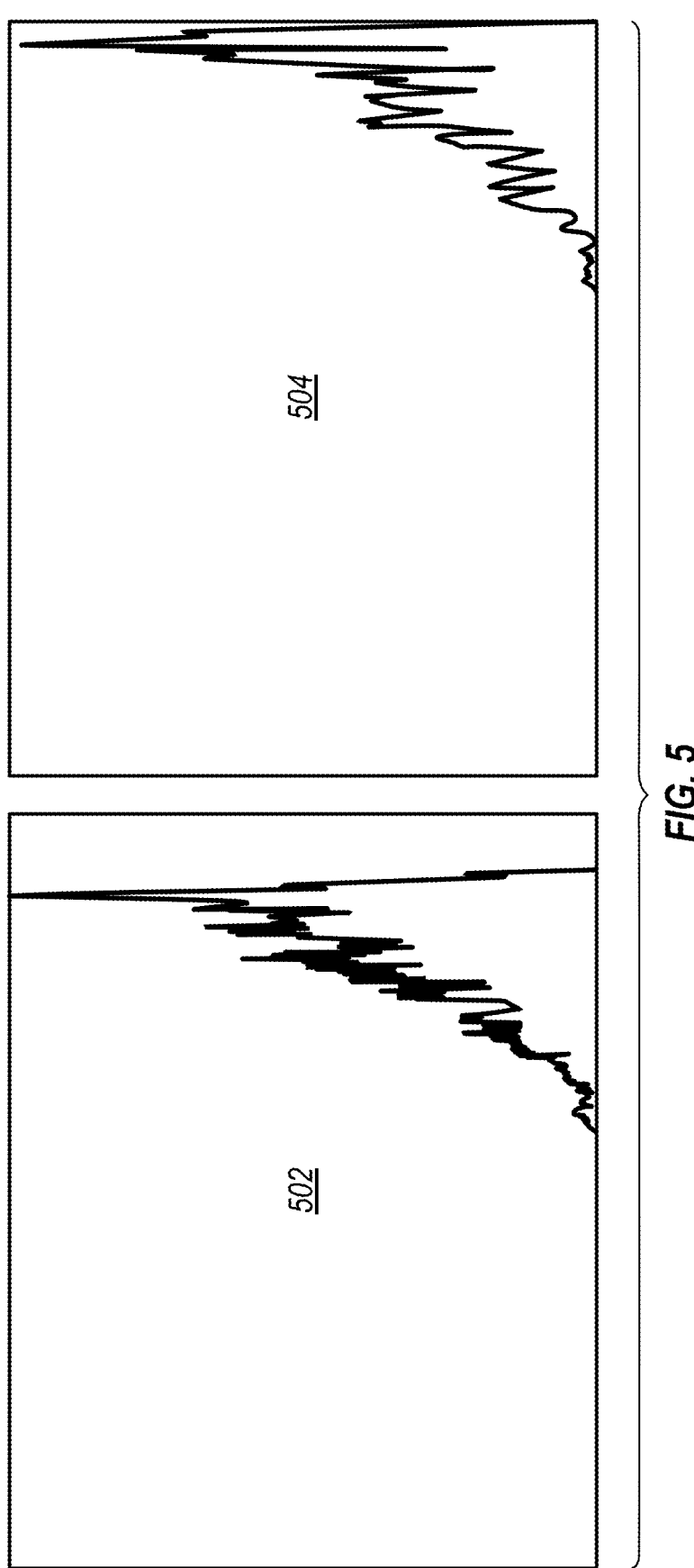
FIG. 5 illustrates example histograms within a fluid leak portion of infrared images.

FIG. 5 illustrates example histograms 502, 504 within a fluid leak portion of infrared images. The histogram 504 may be the pixel histogram of a portion of a post-fluid leak infrared image that depicts the fluid leak. The histogram 502 may be the pixel histogram of the same portion of a pre-fluid leak infrared image. Difference between the areas under the histograms 502, 504 may be calculated as the change in pixel density value. The change in pixel density value may reflect temperature change in the depicted area (fluid leak area) of the scene before and after the fluid leak. Larger change in pixel density value may reflect larger temperature change while smaller change in pixel density value may reflect smaller temperature.

The fluid leak component 108 may be configured to determine an amount of fluid leak at the scene. Determining an amount of fluid leak may include ascertaining, approximating, calculating, establishing, estimating, finding, identifying, obtaining, quantifying, and/or otherwise determining the amount of fluid leak. An amount of fluid leak at the scene may refer to quantity (e.g., mass quantity) of fluid leak at a moment in time (e.g., how much fluid leak is occurring at the moment captured within an infrared image), rate of fluid leak at a moment in time (e.g., how fast/slow the fluid leak is occurring at the moment captured within an infrared image, mass of fluid leak over time), a total amount of fluid leak over a duration of time (e.g., how much fluid leak has occurred over a duration), and/or other amount of fluid leak.

The amount of fluid leak at the scene may be determined based on the change(s) in pixel density value within the portion(s) of the infrared images captured before and after the fluid leak and/or other information. The change(s) in pixel density value may be used as change in temperature of the depicted area. The change in temperature may be related to the amount of fluid leak. For example, the change in temperature may be proportional to the amount of fluid leak. Larger change in pixel density value/larger temperature change reflect larger fluid leak while smaller change in pixel density value/smaller temperature change may reflect smaller fluid leak. For example, larger change in pixel density value/larger temperature change reflect higher density fluid leak while smaller change in pixel density value/smaller temperature change may reflect lower density fluid leak.

Dimensions of fluid leak depicted within the infrared images may be converted from pixel space to physical space (e.g., from number of pixels to distance measurement). The dimension of fluid leak may be converted from pixel space to physical space based on properties of the infrared camera (e.g., focal length, resolution, pixel size) and the distance between the infrared camera and the fluid leak.

In some implementations, the infrared images captured after the fluid leak may depict the fluid leak in two dimensions. To determine the amount of fluid leak, the volume of fluid may be required. The volume of the fluid leak may be determined using the shape of the fluid leak and/or other information. The volume of the fluid leak may be determined using a particular type of shape (e.g., known shape, assumed shape, estimated shape). The shape used to determine the volume may be selected based on the shape of the fluid leak, the shape of the fluid leak (e.g., length, width), the area into which the fluid is being leaked/released, and/or other information.

Figure 6:
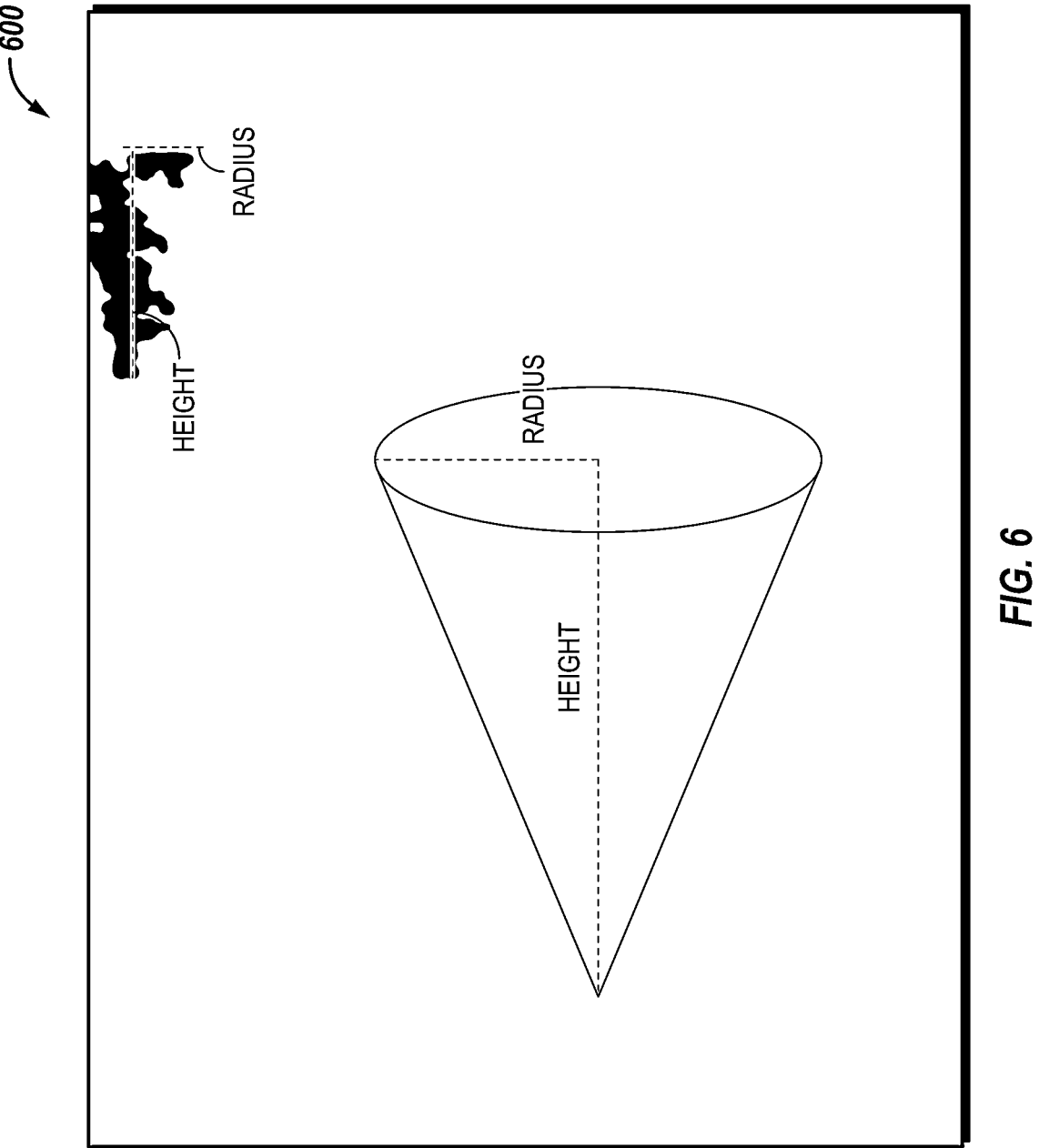
FIG. 6 illustrates an example volume estimation for a fluid leak.

For example, the volume of the fluid leak may be determined using a cone shaped fluid leak, a tank shaped fluid leak, a pool shaped fluid leak, or other shaped fluid leak. The cone shaped fluid leak may be used for fluid leak in the air. The cone shape fluid leak may be used for fluid leak with conical shape. For a cone shaped fluid leak, the volume of the volume leak may be estimated as a cone having (1) a height equal to lateral length of the fluid leak from the release point to the end of the fluid leak, and (2) a radius equal to half of the maximum vertical length of the fluid leak. FIG. 6 illustrates an example volume estimation for a fluid leak using a cone shaped fluid leak.

The tank shaped fluid leak may be used for fluid leak that goes into a drainage area/secondary containment area with a fixed shape. The tank shaped fluid leak may be used for fluid leak that goes into an area of known shape and size. For a tank shaped fluid leak, the volume of the fluid leak may be estimated as a volume that has dimensions and geometry of the area into which the fluid leak is collecting. For example, for fluid leak being collected in a cylindrical tank, the volume of the fluid leak may be estimated as the volume of the cylindrical. Other known shapes and sizes are contemplated.

The pool shaped fluid leak may be used for fluid leak on the ground. The pool shaped fluid leak may be used for fluid leak into an area without a defined boundary. The pool shaped fluid leak may be used for fluid leak with changing shape. For a pool-shaped fluke leak, the volume of the fluid leak may be estimated as a circular shape (or a combination of circular shapes). The height of volume may be set based on the type(s) of fluid in the fluid leak. The fluid properties may be used to set the height of the volume.

The shape used to determine the volume may change over time. For example, the volume of the fluid leak may be initially estimated as a pool shaped fluid leak. As more fluid is released, the shape of the fluid leak may correspond more to a tank-shaped leak, and the volume of the fluid leak may be estimated as a tank shaped fluid leak instead.

The change in pixel density value over the two-dimensional portion of the infrared image may be expanded to cover the volume of the fluid leak. The change in pixel density value over the two-dimensional portion of the infrared image may be multiple by a value that expands the area of the two-dimensional portion to the volume of the fluid leak. The change in pixel density value may be converted into fluid leak amount (e.g., fluid density in the fluid leak) based on the type(s) of fluid in the fluid leak. Fluid density in the fluid leak may be multiplied by the volume of the fluid leak to determine total mass of the fluid leak. In some implementations, the conversion from the change in pixel density value into fluid amount may be performed based on quantification of prior fluid leaks. Quantification of prior fluid leaks may be used to match different changes in pixel density value to different fluid amounts.

In some implementations, separate amounts of the fluid leak at the scene for different times may be determined from different infrared image of the scene captured after the fluid leak at the scene. For example, different post-fluid leak infrared images may be compared to pre-fluid leak infrared images to determine the quantities and/or rates of fluid leak depicted in different infrared images. A rate (an average rate) of the fluid leak at the scene may be determined based on the separate amounts of the fluid leak at the scene for the different times and/or other information. For example, quantities of fluid leak depicted in different infrared images may be used to calculate the rate of fluid leak. The rate of fluid leak depicted in different infrared images may be averaged to calculate the rate of fluid leak. For example, infrared images may be captured at 10-frames per second. Calculation of fluid leak rates may be performed from each of the 10 infrared images, and the calculated fluid leak rates may be averaged into a fluid leak rate per second.

In some implementations, a total amount of fluid leak may be determined based on the rate of the fluid leak at the scene, a duration of the fluid leak at the scene, and/or other information. The amount of fluid leak may be accumulated by multiplying the rate of fluid leak by the duration of the fluid leak. The total amount of the fluid leak may be accumulated as the fluid leak rates are computed. The different fluid leak rates may be multiplied by corresponding fluid leak durations to measure changes in fluid leak amounts, and the different fluid leak amounts may be summed into the total amount of fluid leak.

In some implementations, a release location of the fluid leak may be determined. The release location of the fluid leak may refer to the location from which the fluid leak starts. The release location of the fluid leak may refer to the location in the fluid facility (e.g., location in the equipment) where the fluid is being released. The release location of the fluid leak may be determined based on a location of the infrared camera, an orientation of the infrared camera, a distance between the infrared camera and the fluid leak, and/or other information. The location of the infrared camera may refer to where the infrared camera is placed (e.g., XYZ location, GPS location). The location of the infrared camera may include latitude and longitude of the infrared camera, as well as the elevation of the infrared camera. The orientation of the infrared camera may refer to the direction in which the infrared camera is pointed. The distance between the infrared camera and the fluid leak may refer to the amount of space between the infrared camera and the fluid leak. The location of the infrared camera and the orientation of the infrared camera may be known/set. The distance between the infrared camera and the fluid leak may be determined based on distance estimation from the infrared images of the fluid leak.

In some implementations, a dispersion of the fluid leak from the release location may be determined. The dispersion of the fluid leak from the release location may refer to movement of the fluid leak from the release location. The dispersion of the fluid leak from the release location may refer to spreading of the fluid leak from the release location. The dispersion of the fluid leak from the release location may be determined based on a rate of the fluid leak, a wind speed (e.g., sustained wind speed, gust wind speed) at the scene, a wind direction (e.g., sustained wind direction, gust wind direction) at the scene, and/or other information. The wind speed and wind direction at the scene may be measured using wind sensors. The wind speed and wind direction at the scene may be estimated using local weather conditions. A tuned dispersion model may be used to estimate how the fluid leak is dispersing from the release point.

Figure 7:
FIG. 7 illustrates an example infrared image with visualization of a fluid leak, a rate of the fluid leak, and a total amount of the fluid leak.

In some implementations, one or more of the infrared images may be presented on one or more displays. The infrared image(s) may be overlaid with visualization of the fluid leak, a rate of the fluid leak, a total amount of the fluid leak, and/or other information. The visualized information may be accompanied by a confidence level (e.g., percentage of accuracy). For example, FIG. 7 illustrates an example infrared image 700 with visualization of a fluid leak 702. The visualization of the fluid leak 702 may differentiate the area of the fluid leak from other areas of the scene depicted in the infrared image 700. The infrared image 700 may be overlaid with visualization of other information, such as (1) whether a leak has been detected, (2) the identity (e.g., frame number) of the infrared image being presented, (3) a rate of the fluid leak, (4) confidence level of the fluid leak, (5) distance between the infrared camera and the fluid leak, and (6) a total amount of the fluid leak. Visualization of other information is contemplated.

Figure 8:
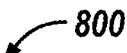
FIG. 8 illustrates an example top-down view of a scene with a fluid leak.

In some implementations, a top-down view of the scene may be presented on one or more displays. The top-down view of the scene may include diagrammatic (graphic) and/or pictorial view of the scene from above. The top-down view of the scene may include visualization of the fluid leak, the infrared camera, a dispersion of the fluid leak, and/or other information. For example, FIG. 8 illustrates an example top-down view 800 of a scene with a fluid leak. The top-down view 800 may include a pictorial view of the scene from above, with a representation 802 of the fluid leak release location, a representation 804 of the infrared camera, and a representation 806 of the dispersion of the fluid leak.

The top-down view 800 may be interactable. For example, a user may interact with the top-down view 800 to change the zoom or pan the depicted location to see other parts of the scene. A user may click on one or more of the representations 802, 804, 806 to see related information. For example, clicking on the representation 802 of the fluid leak release location may result in presentation of information about the fluid leak (e.g., fluid leak rate, total amount of fluid leak, types of fluid in the fluid leak, GPS location of the fluid leak, wind speed and wind direction at the fluid leak location, weather condition at the fluid leak, equipment from which fluid is being leaked, safety hazard posed by fluid leak). Clicking on the representation 804 of the infrared camera may result in presentation of information about the infrared camera (e.g., GPS location of the infrared camera, wind speed and wind direction at the infrared camera location, weather condition at the infrared camera location). Clicking on the representation 806 of the dispersion of the fluid leak may result in presentation of information about the fluid leak dispersion (e.g., rate of fluid leak dispersion; total amount of fluid leak dispersed; total area covered by fluid leak dispersion; safety hazard posed by fluid leak dispersion). Presentation of other types of information is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for detecting fluid leaks. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, infrared image information and/or other information may be obtained. The infrared image information may define infrared images of a scene captured by an infrared camera. The infrared images of the scene may include a first infrared image of the scene captured before a fluid leak at the scene, a second infrared image of the scene captured after the fluid leak at the scene, and/or other infrared images of the scene. In some implementations, operation 202 may be performed by a processor component the same as or similar to the infrared image component 102 (Shown in FIG. 1 and described herein).

At operation 204, a portion of the infrared images depicting the fluid leak at the scene may be identified. In some implementations, operation 204 may be performed by a processor component the same as or similar to the identification component 104 (Shown in FIG. 1 and described herein).

At operation 206, a change in pixel density value within the portion of the infrared images captured before and after the fluid leak may be determined. The change in the pixel density value within the portion of the infrared images may reflect a change in temperature of an area of the scene depicted within the portion of the infrared images captured before and after the fluid leak. In some implementations, operation 206 may be performed by a processor component the same as or similar to the pixel density value component 106 (Shown in FIG. 1 and described herein).

At operation 208, an amount of the fluid leak at the scene may be determined based on the change in pixel density value within the portion of the infrared images captured before and after the fluid leak and/or other information. In some implementations, operation 208 may be performed by a processor component the same as or similar to the fluid leak component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for detecting fluid leaks, the system comprising:

one or more physical processors configured by machine-readable instructions to:

obtain infrared image information, the infrared image information defining infrared images of a scene captured by an infrared camera, the infrared images of the scene including a first infrared image of the scene captured before a fluid leak at the scene and a second infrared image of the scene captured after the fluid leak at the scene;

detect the fluid leak at the scene based on an observation made by an acoustic sensor, a gas sensor, a fluid sensor, or a point sensor, wherein the fluid leak at the scene is detected independent of the infrared images of the scene captured by the infrared camera;

identify a portion of the infrared images depicting the fluid leak at the scene;

determine a change in pixel density value within the portion of the infrared images captured before and after the fluid leak, the change in the pixel density value within the portion of the infrared images reflecting a change in temperature of an area of the scene depicted within the portion of the infrared images captured before and after the fluid leak; and determine an amount of the fluid leak at the scene based on the change in pixel density value within the portion of the infrared images captured before and after the fluid leak;

wherein:

the infrared images captured after the fluid leak depicts the fluid leak in two dimensions; and a volume of the fluid leak is estimated by matching a shape to the fluid leak based on an area into which the fluid leak is occurring, wherein:

responsive to the area into which the fluid leak is occurring being the air, a cone shape is matched to the fluid leak to estimate the volume of the fluid leak;

responsive to the area into which the fluid leak is occurring being a drainage area or a secondary containment area, a tank shape is matched to the fluid leak to estimate the volume of the fluid leak; and responsive to the area into which the fluid leak is occurring being the ground, a pool shape is matched to the fluid leak to estimate the volume of the fluid leak.

2. The system of claim 1, wherein the change in the pixel density value within the portion of the infrared images captured before and after the fluid leak is determined as a difference between a first area under a post-fluid leak pixel histogram of the portion captured after the fluid leak and a second area under a pre-fluid leak pixel histogram of the portion captured before the fluid leak.

3. The system of claim 1, wherein:

separate amounts of the fluid leak at the scene for different times are determined from different infrared image of the scene captured after the fluid leak at the scene; and a rate of the fluid leak at the scene is determined based on the separate amounts of the fluid leak at the scene for the different times.

4. The system of claim 3, wherein a total amount of the fluid leak is determined based on the rate of the fluid leak at the scene and a duration of the fluid leak at the scene.

5. The system of claim 1, wherein non-fluid leak object detection is performed on the infrared images of the scene to filter out one or more portions of the infrared images not depicting the fluid leak at the scene.

6. The system of claim 1, wherein a release location of the fluid leak is determined based on a location of the infrared camera, an orientation of the infrared camera, and a distance between the infrared camera and the fluid leak.

7. The system of claim 6, wherein a dispersion of the fluid leak from the release location is determined based on a rate of the fluid leak, a wind speed at the scene, and a wind direction at the scene.

8. The system of claim 1, wherein the one or more physical processors are further configured by the machine-readable instructions to present one or more of the infrared images on a display, wherein the one or more of the infrared images are overlaid with visualization of the fluid leak, a rate of the fluid leak, and a total amount of the fluid leak.

9. The system of claim 1, wherein the one or more physical processors are further configured by the machine-readable instructions to present a top-down view of the scene on a display, wherein the top-down view of the scene includes visualization of a dispersion of the fluid leak.

10. A method for detecting fluid leaks, the method comprising:

obtaining infrared image information, the infrared image information defining infrared images of a scene captured by an infrared camera, the infrared images of the scene including a first infrared image of the scene captured before a fluid leak at the scene and a second infrared image of the scene captured after the fluid leak at the scene;

detecting the fluid leak at the scene based on an observation made by an acoustic sensor, a gas sensor, a fluid sensor, or a point sensor, wherein the fluid leak at the scene is detected independent of the infrared images of the scene captured by the infrared camera;

identifying a portion of the infrared images depicting the fluid leak at the scene;

determining a change in pixel density value within the portion of the infrared images captured before and after the fluid leak, the change in the pixel density value within the portion of the infrared images reflecting a change in temperature of an area of the scene depicted within the portion of the infrared images captured before and after the fluid leak; and determining an amount of the fluid leak at the scene based on the change in pixel density value within the portion of the infrared images captured before and after the fluid leak;

wherein:

the infrared images captured after the fluid leak depicts the fluid leak in two dimensions; and a volume of the fluid leak is estimated by matching a shape to the fluid leak based on an area into which the fluid leak is occurring, wherein:

responsive to the area into which the fluid leak is occurring being the air, a cone shape is matched to the fluid leak to estimate the volume of the fluid leak;

responsive to the area into which the fluid leak is occurring being a drainage area or a secondary containment area, a tank shape is matched to the fluid leak to estimate the volume of the fluid leak; and responsive to the area into which the fluid leak is occurring being the ground, a pool shape is matched to the fluid leak to estimate the volume of the fluid leak.

11. The method of claim 10, wherein the change in the pixel density value within the portion of the infrared images captured before and after the fluid leak is determined as a difference between a first area under a post-fluid leak pixel histogram of the portion captured after the fluid leak and a second area under a pre-fluid leak pixel histogram of the portion captured before the fluid leak.

12. The method of claim 10, wherein:

separate amounts of the fluid leak at the scene for different times are determined from different infrared image of the scene captured after the fluid leak at the scene; and a rate of the fluid leak at the scene is determined based on the separate amounts of the fluid leak at the scene for the different times.

13. The method of claim 12, wherein a total amount of the fluid leak is determined based on the rate of the fluid leak at the scene and a duration of the fluid leak at the scene.

14. The method of claim 10, wherein non-fluid leak object detection is performed on the infrared images of the scene to filter out one or more portions of the infrared images not depicting the fluid leak at the scene.

15. The method of claim 10, wherein a release location of the fluid leak is determined based on a location of the infrared camera, an orientation of the infrared camera, and a distance between the infrared camera and the fluid leak.

16. The method of claim 15, wherein a dispersion of the fluid leak from the release location is determined based on a rate of the fluid leak, a wind speed at the scene, and a wind direction at the scene.

17. The method of claim 10, further comprising presenting one or more of the infrared images on a display, wherein the one or more of the infrared images are overlaid with visualization of the fluid leak, a rate of the fluid leak, and a total amount of the fluid leak.

18. The method of claim 10, wherein further comprising presenting a top-down view of the scene on a display, wherein the top-down view of the scene includes visualization of a dispersion of the fluid leak.

\*    \*    \*    \*    \*